(12) United States Patent
Kim

(10) Patent No.: US 10,829,146 B2
(45) Date of Patent: Nov. 10, 2020

(54) VEHICLE MOTOR CONTROL APPARATUS AND METHOD

(71) Applicant: Mando Corporation, Pyeongtaek-si (KR)

(72) Inventor: Tae Sik Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/451,850

(22) Filed: Jun. 25, 2019

(65) Prior Publication Data

US 2020/0001913 A1    Jan. 2, 2020

(30) Foreign Application Priority Data

Jun. 29, 2018 (KR) ........................ 10-2018-0075451

(51) Int. Cl.
*H02H 7/08* (2006.01)
*B62D 5/04* (2006.01)
*H02P 29/024* (2016.01)
*H02P 6/28* (2016.01)

(52) U.S. Cl.
CPC ......... *B62D 5/0484* (2013.01); *B62D 5/0487* (2013.01); *H02P 6/28* (2016.02); *H02P 29/024* (2013.01)

(58) Field of Classification Search
CPC ........ B62D 5/0484; B62D 5/0487; H02P 6/28
USPC ..................................... 318/400.21
See application file for complete search history.

(56) References Cited

U.S. PATENT DOCUMENTS

| 7,372,227 | B2 * | 5/2008 | Rainer ...................... H02P 3/22 318/375 |
| 9,548,605 | B2 * | 1/2017 | Lewis ...................... H02P 29/02 |
| 2014/0285128 | A1 * | 9/2014 | Ozaki ...................... B60L 50/51 318/400.13 |
| 2019/0023315 | A1 * | 1/2019 | Takizawa .............. B62D 5/0487 |
| 2019/0111964 | A1 * | 4/2019 | Kim ........................ B62D 5/049 |

\* cited by examiner

*Primary Examiner* — Erick D Glass
(74) *Attorney, Agent, or Firm* — Hauptman Ham, LLP

(57) ABSTRACT

The present disclosure relates to an apparatus and method for controlling a motor in which a failure has occurred in a vehicle steering system. A vehicle motor control apparatus according to an embodiment may include a motor failure sensor configured to determine whether a failure has occurred in a motor based on information of a current flowing in each phase of the motor provided in a vehicle steering system, and a motor controller configured to apply a demagnetization current to the motor for permanently demagnetizing the magnet in the motor when the failure has occurred in the motor. Accordingly, a driver is capable of performing stable steering even when the motor has failed.

14 Claims, 9 Drawing Sheets

100

VEHICLE MOTOR CONTROL APPARATUS AND METHOD

CROSS REFERENCE TO RELATED APPLICATION

This application claims priority from Korean Patent Application No. 10-2018-0075451, filed on Jun. 29, 2018, which is hereby incorporated by reference for all purposes as if fully set forth herein.

BACKGROUND OF THE INVENTION

1. Field of the Invention

The present disclosure relates to an apparatus and method for controlling a motor in which a failure has occurred in a vehicle steering system. More specifically, the present disclosure relates to a specific apparatus and method for determining whether or not a failure of a motor provided in a steering system has occurred, and then applying a sufficient demagnetization current to the motor for permanent demagnetization of a magnet in the motor such that steering by a driver is not disturbed.

2. Description of the Prior Art

Generally, the term "steering system of a vehicle" means a system in which a driver of a vehicle is able to change the steering angle of vehicle wheels based on a steering force (or a turning force) applied to a steering wheel. In recent years, an electric power steering (EPS) system has been applied to a vehicle in order to ensure the stability of a steering state by reducing the steering force of a steering wheel.

The electric power steering system is capable of driving a motor depending on the speed state and the torque state of the vehicle in order to provide a light and comfortable steering feeling to the driver of the vehicle at a low speed, to provide a heavy and safe steering feeling to the driver of the vehicle at a high speed, and to provide an optimal steering state for the driver of the vehicle in emergency so that rapid steering can be performed.

Generally, a three-phase motor may be used in order to generate an auxiliary steering torque in an electric power steering system. A motor used in a steering system may fail due to a short circuit between the windings or disconnection. In this case, it is necessary to interrupt the operation of the motor by stopping the supply of a current. However, even after stopping the supply of the current to the motor, a braking torque may be generated as the rotor in the motor rotates. Accordingly, it is necessary to apply a greater force than that applied when the motor does not malfunction, which may disturb the driver's steering.

SUMMARY OF THE INVENTION

An embodiment conceived in view of the above is intended to provide a vehicle motor control apparatus and method in which a demagnetization current is applied for permanently demagnetizing a magnet in a motor when a failure of a motor has occurred, thereby enabling a driver to perform a stable steering operation even when the motor has failed.

In addition, an embodiment is intended to provide a vehicle motor control apparatus and method in which all multiple demagnetization current application methods, which are capable of being performed as a measure of coping with a failure situation, are performed for permanently demagnetizing a magnet in the motor even when the failure condition of the motor is not specifically detected, thereby enabling a driver to perform a stable steering operation.

An embodiment provides a vehicle motor control apparatus including: a motor failure sensor configured to determine whether a failure has occurred in a motor based on information of a current flowing in each phase of the motor provided in a vehicle steering system; and a motor controller configured to apply a demagnetization current to the motor for permanently demagnetizing the magnet in the motor when the failure has occurred in the motor.

In addition, an embodiment provides a vehicle motor control method including: a motor failure detection step of determining whether a failure has occurred in a motor based on information of a current flowing in each phase of the motor provided in a vehicle steering system; and a motor control step of applying a demagnetization current to the motor for permanently demagnetizing the magnet in the motor when the failure has occurred in the motor.

According to an embodiment described above, it is possible to provide a vehicle motor control apparatus and method in which a demagnetization current is applied for permanently demagnetizing a magnet in a motor when a failure of a motor has occurred, thereby enabling a driver to perform a stable steering operation even when the motor has failed.

In addition, according to an embodiment, it is possible to provide a vehicle motor control apparatus and method in which all multiple demagnetization current application methods, which are capable of being performed as a measure of coping with a failure situation, are performed for permanently demagnetizing a magnet in the motor even when a failure situation of the motor is not specifically detected, thereby enabling a driver to perform a stable steering operation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
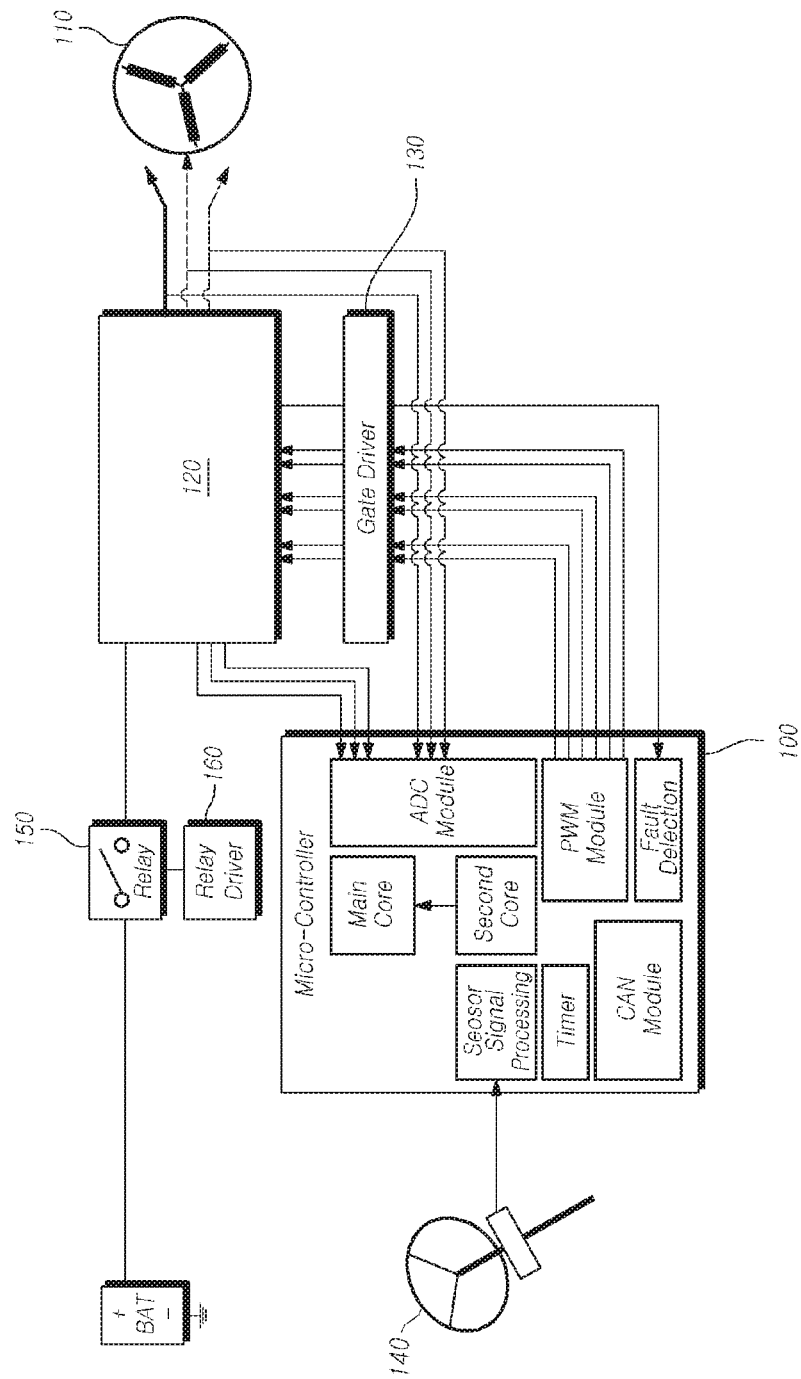
FIG. 1 is a diagram schematically illustrating an electric power steering system to which an embodiment is applicable.

Hereinafter, embodiments of the present disclosure will be described with reference to exemplary diagrams. In the specification, in adding reference numerals to components throughout the drawings, it should be noted that like reference numerals designate like components even though components are shown in different drawings. Further, in describing embodiments of the present disclosure, well-known functions or constructions will not be described in detail since they may unnecessarily obscure the understanding of the present disclosure.

Further, terms such as 'first', 'second', 'A', 'B', '(a)', and '(b)' may be used for describing components of the present disclosure. These terms are used only for discriminating the components from other components, so the essence or order of the components indicated by those terms is not limited. It should be understood that when one element is referred to as being "connected to", "combined with" or "coupled to" another element, it may be connected directly to or coupled directly to another element, or another element may be "connected", "combined", or "coupled" between them.

In the present disclosure, the term "motor" means a motor for providing an auxiliary steering torque depending on the driver's steering torque in an electric power steering system. For example, in the present disclosure, the term "motor" may mean a three-phase brushless AC (BLAC) motor. In the following description, a three-phase BLAC motor is used as a reference, but the present disclosure is applicable to various three-phase motors.

In addition, in the present disclosure, the term "demagnetization current" means a current that is capable of permanently demagnetizing a magnet in a motor of an electric power steering system by being applied to the motor. That is, the term "demagnetization current" may mean a current applied to a motor in order to prevent a braking torque from being generated in the motor even if the current supplied to the motor is interrupted by irreversibly demagnetizing the magnet in the motor. Hereinafter, though the term "demagnetization current" is used for a current for demagnetizing a magnet in a three-phase BLAC motor, this is an example and the present disclosure is not limited by the term. For example, the demagnetization current may also be referred to as a term such as a permanent demagnetization current.

Hereinafter, a vehicle motor control apparatus and method according to the present disclosure will be described with reference to the accompanying drawings.

FIG. 1 is a diagram schematically illustrating an electric power steering system to which an embodiment is applicable.

Referring to FIG. 1, an electric power steering system to which the present disclosure is applicable is schematically illustrated. As an example, the electric power steering system may include a motor 110 that generates an auxiliary steering torque. In addition, the electric power steering system may include an inverter 120 for supplying a current to the three phases of the motor 110. The inverter 120 may be driven by a gate driver 130. A vehicle motor control apparatus 100 is able to control the operation of the motor 110 using information about a driver's steering torque, information about a phase information of the motor 110, or the like, which are received from the torque sensor 140. As an example, the vehicle motor control apparatus 100 may constitute a part of a microcontroller in a vehicle. That is, the microcontroller may include various modules such as a timer, a CAN communication module, and a sensing-information-processing module, and may include a module for motor control. Hereinafter, for convenience of description in the present specification, the term "vehicle motor control apparatus 100" is used to include all the modules necessary for controlling the operation of the motor, and the vehicle motor control apparatus 100 may further include the above-mentioned timer, CAN communication modules, and the like. However, the present disclosure is not limited thereto, and the timer, the CAN communication module, and the like may be configured separately from the vehicle motor control apparatus 100.

Meanwhile, conventionally, when a failure has occurred in the electric power steering system such as the motor 110, the relay circuit 150 at the front terminal of an inverter 120 is opened to stop the operation of the motor 110. A relay circuit 150 may be controlled by a relay driver 160. Specifically, conventionally, when an abnormality is detected in the motor 110, it is impossible to generate an auxiliary steering torque in response to the driver's steering torque. Thus, a control is performed such that the relay circuit 150 is opened in order to stop the motor 110. That is, when an abnormality is detected in the electric power steering system including the motor 110, the operation of the entire electric power steering system is stopped, and the supply of the auxiliary steering torque may not be maintained.

Figure 2:
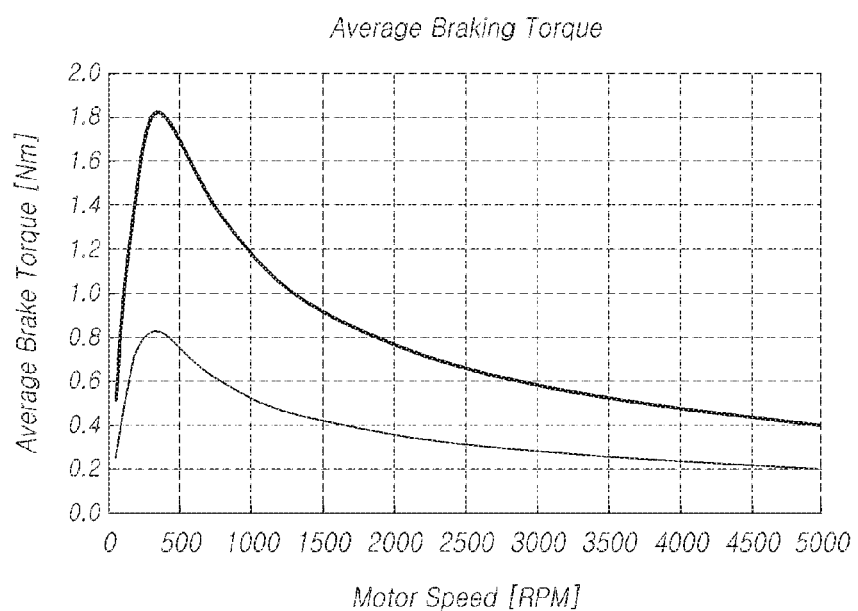
FIG. 2 is a diagram for explaining an exemplary braking torque generated when a motor fails according to an embodiment.

However, when the electric power steering system is stopped while the vehicle is running, as illustrated in FIG. 2, a braking torque may be generated in the motor 110 even when the motor has been disconnected from the electric current. As a result, the situation in which the steering of the vehicle is performed only when the driver steers the vehicle with a stronger force than usual may occur. Hereinafter, a braking torque that may be generated in the steering assist motor will be described with reference to FIG. 2.

FIG. 2 is a diagram for explaining an exemplary braking torque generated when a motor fails according to an embodiment.

Referring to FIG. 2, a braking torque may be generated as the rotor rotates after the operation of the motor is stopped when a short circuit or disconnection has occurred between the windings of the motor.

Specifically, when all the three phases have been short-circuited, or when any two phases have been short-circuited, the average braking torque may have a value exceeding zero. For example, in the case in which the motor speed is 500 RPM, when all the three phases have been short-circuited, the braking torque has a value of about 1.7 Nm and when any two phases have been short-circuited, the braking torque has a value of about 0.8 Nm. In this case, since the above braking torque values are generated by the motor that assists the driver's steering, the driver is able to steer the vehicle only by steering with a torque equal to or higher than the above braking torque values. Therefore, for example, in the case in which the speed of the motor is 500 RPM, the steering is enabled only when the driver applies a force equal to or greater than the braking torque values described above at respective situations. In this case, the electric power steering system provided to assist the driver's steering may rather disturb the driver's steering.

Therefore, in the above case, when an abnormality has occurred in the motor during running and thus the supply of the motor current is interrupted, the situation in which the supply of the auxiliary steering torque is suddenly stopped and it is necessary to apply a force stronger than that applied when there is no auxiliary steering torque may occur. Accordingly, the present disclosure is intended to provide a vehicle motor control and method capable of providing a safe steering feeling to the driver by applying a demagnetization current capable of permanently demagnetizing a magnet in a motor depending on a failure situation in order to prevent or minimize the generation of a braking torque due to current interruption.

Hereinafter, a vehicle motor control apparatus according to an embodiment will be described.

Figure 3:
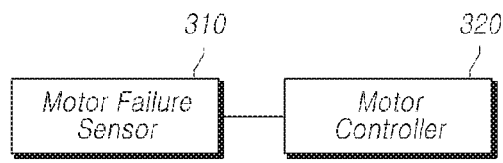
FIG. 3 is a diagram for explaining the configuration of a vehicle motor control apparatus according to an embodiment.

FIG. 3 is a diagram for explaining the configuration of a vehicle motor control apparatus according to an embodiment.

Referring to FIG. 3, a vehicle motor control apparatus 100 according to an embodiment may include a motor failure sensor 310 configured to determine whether a failure has occurred in a motor based on information of a current flowing in each phase of a motor provided in a vehicle steering system, and a motor controller 320 configured to apply a demagnetization current to the motor for permanently demagnetizing the magnet in the motor when the failure has occurred in the motor.

According to an embodiment, the motor failure sensor 310 may determine whether a failure has occurred in the motor based on information about a current flowing in each phase of the motor provided in the vehicle steering system. For example, the motor failure sensor 310 may detect the failure of the motor based on information of the current supplied to each phase of the motor. To this end, the motor failure sensor 310 may receive information from a separate sensor in order to determine whether the motor has failed. For example, the motor failure sensor 310 may receive information about a current supplied to each phase of the motor via a current sensor or a shunt sensor located inside or outside the motor. In this case, the motor failure sensor 310 may determine that a failure has occurred in the motor when normal current information is not received for each phase.

In addition, according to an embodiment, the motor failure sensor 310 may determine the failure type of the motor based on the current information. The failure type of the motor may be classified into disconnection of at least one of respective phases, a short circuit of at least two of respective phases of the motor, or non-identification of the failure type. In other words, the motor failure sensor 310 may determine which phase has been disconnected among the three phases in the motor or which phases have been short-circuited among the three phases of the motor, or may not determine the failure type of the motor. For example, the motor failure sensor 310 may determine which one of the U phase, V phase, and W phase, which are the three phases of the motor, has been disconnected based on the phase current information of the motor. In addition, the motor failure sensor 310 may determine which one of the U phase, V phase, and W phase, which are the three phases of the motor, has been short-circuited based on the phase current information of the motor. In this case, it is possible to determine whether all the three phases of the motor have been short-circuited based on the phase current information of the motor. In addition, there may be a case in which the motor failure sensor 310 is capable of determining whether the motor has failed based on the current information of each phase, but it is impossible to identify the phase in which a failure has occurred and to identify whether each phase has been short-circuited or disconnected. In this case, the motor failure sensor may determine whether the motor has failed, but may be determined that the failure type of the corresponding motor is not identified. The detailed operations of the motor failure sensor 310 will be described in more detail below with reference to FIG. 4.

Meanwhile, when a failure has occurred in the motor, the motor controller 320 may apply a demagnetization current to the motor for permanently demagnetizing the magnet in the motor. That is, when a motor failure is detected by the motor failure sensor 310, the motor controller 320 may apply a demagnetization current for permanently demagnetizing the motor magnet in order to prevent or minimize the occurrence of the braking torque of the motor, rather than simply interrupting the current supplied to the motor. At this time, the demagnetization current for permanent demagnetization of the motor magnet may be preset based on a motor-inherent characteristic. That is, since the magnitude of a high current sufficient for the permanent magnetization of the magnet in the motor is determined depending on the characteristic of the motor magnet, the demagnetization current supplied from the motor controller 320 may be a preset current value or may be a value set by the user. In this case, the demagnetization current will be described in more detail below with reference to FIG. 5.

When any one phase of the motor has been disconnected, the motor controller 320 may apply a current such that a demagnetization current flows in the remaining phases, which have not been disconnected. That is, since no current flows in the disconnected phase when any one phase in the motor has been disconnected, it is possible to permanently demagnetize the magnet in the motor by causing a demagnetization current to flow in the remaining phases. Through this, in the vehicle motor control apparatus 100, it is possible to prevent a braking torque from being generated in the motor due to the residual current or magnetic component, or to minimize the generation of the braking torque.

In this case, when the motor has been disconnected in the U phase, the motor controller 320 applies the demagnetization current from the V phase to the W phase, when the motor has been disconnected in the V phase, the motor controller 320 applies the demagnetization current from the W phase to the U phase, and when the motor has been disconnected in the W phase, the motor controller 320 may apply the demagnetization current from the U phase to the V phase. That is, with respect to the U phase, V phase, and W phase, each of which is one phase of the three-phase motor, as a measure of coping with three types of disconnection for efficient permanent demagnetization, the motor controller 320 may set in advance the direction in which the demagnetization current is to flow when any one phase is disconnected.

Meanwhile, when any two phases of the motor have been short-circuited, the motor controller 320 may apply a current such that the demagnetization current flows from the remaining non-short-circuited phase to the two short-circuited phases. That is, when the two phases in the motor have been short-circuited, the short-circuited phases become equal in potential and the same current flows therein. Thus, the motor controller 320 is able to permanently demagnetize the magnet in the motor by causing the demagnetization current to flow from the non-short-circuited phase to the short-circuited phases. Through this, in the vehicle motor control apparatus 100, it is possible to prevent a braking torque from being generated in the motor due to the residual current or magnetic component, or to minimize the generation of the braking torque.

In this case, when the U phase and the V phase of the motor have been short-circuited, the motor controller 320 applies the demagnetization current from the W phase to the U and V phases, when the V phase and the W phase of the motor have been short-circuited, the motor controller 320 applies the demagnetization current from the U phase to the V and W phases, and when the W phase and the U phase of the motor have been short-circuited, the motor controller 320 may apply the demagnetization current from the V phase to the U and V phases. That is, with respect to the U phase, V phase, and W phase, each of which is one phase of the motor, as a measure of coping with three cases in which any two phases are short-circuited for efficient permanent demagnetization, the motor controller 320 may set in advance the direction in which the demagnetization current is to flow in each case in which any two phases may be short-circuited.

In addition, when the three phases of the motor have been short-circuited, the motor controller 320 may apply a current such that the demagnetization current flows from the U phase to the V phase. That is, when the three phases of the motor have been short-circuited, since the short-circuited phases have the same potential and the same current flows therein, it is possible to permanently demagnetize the magnet in the motor even when the demagnetization current is applied to any phase. However, for efficient permanent demagnetization of the magnet in the motor, the motor controller 320 may set in advance the direction in which the demagnetization current is to flow when the three phases are short-circuited. According to an example, the direction of the demagnetization current for permanently demagnetizing the magnet when the three phases have been short-circuited may be set to the direction in which the demagnetization current flows from the U phase to the V phase.

Meanwhile, when the type of a failure in the motor is not identified, the motor controller 320 according to an embodiment may perform all multiple methods of applying a current such that the demagnetization current flows from each phase of the motor to the other two phases or multiple methods of applying a current such that the demagnetization current flows to two of respective phases of the motor. That is, there may be a case in which it is determined that a motor failure has occurred by the motor failure sensor 310, but it is impossible to specifically determine which phase has failed or it is impossible to determine whether each phase has been short-circuited or disconnected. In this case, the motor controller 320 needs to prevent or minimize the generation of the braking torque of the motor based on the determination of occurrence of the motor failure. Therefore, the motor controller 320 needs to apply the demagnetization current for the permanent demagnetization of the magnet in the motor even when it is impossible to detect a phase in which a failure has occurred in the motor or to determine whether each phase has been short-circuited or disconnected. In this case, the motor controller 320 may perform all executable methods of applying a demagnetization current in all the cases in which any one phase has been disconnected or any two phases have been short-circuited. At this time, the motor controller 320 may execute the methods of applying a demagnetization current in an arbitrary order without being limited to any specific order. However, this is merely an example, and the present disclosure is not limited thereto. The order of the methods of applying a demagnetization current, which are executed by the motor controller 320, may be set in advance. Through this, in the vehicle motor control apparatus 100, it is possible to prevent a braking torque from being generated in the motor due to the residual current or magnetic component, or to minimize the generation of the braking torque.

In addition, according to an example, the motor controller 320 may interrupt the current supplied to the motor after applying the demagnetization current. That is, when the motor controller 320 has applied the demagnetization current, the permanent magnet has been permanently demagnetized in the motor. Thus, the corresponding motor no longer functions as a motor. Accordingly, the motor controller 320 may interrupt the current supplied to the motor after permanently demagnetizing the motor magnet in order to prevent unnecessary current application and to ensure stable running of the vehicle. Through this, the motor controller 320 is capable of performing efficient control of the vehicle.

The motor failure sensor 310 and the motor controller 320 of the motor control apparatus 100 described above may be implemented using one or more microprocessors operated by a set program for the purpose described above, and the set program may include a series of instructions for performing respective steps included in the vehicle motor control method according to an embodiment of the technical idea of the present disclosure described below.

Hereinafter, how each component of the vehicle motor control apparatus 100 can be operated will be described in detail with reference to FIGS. 4 to 8.

Figure 4:
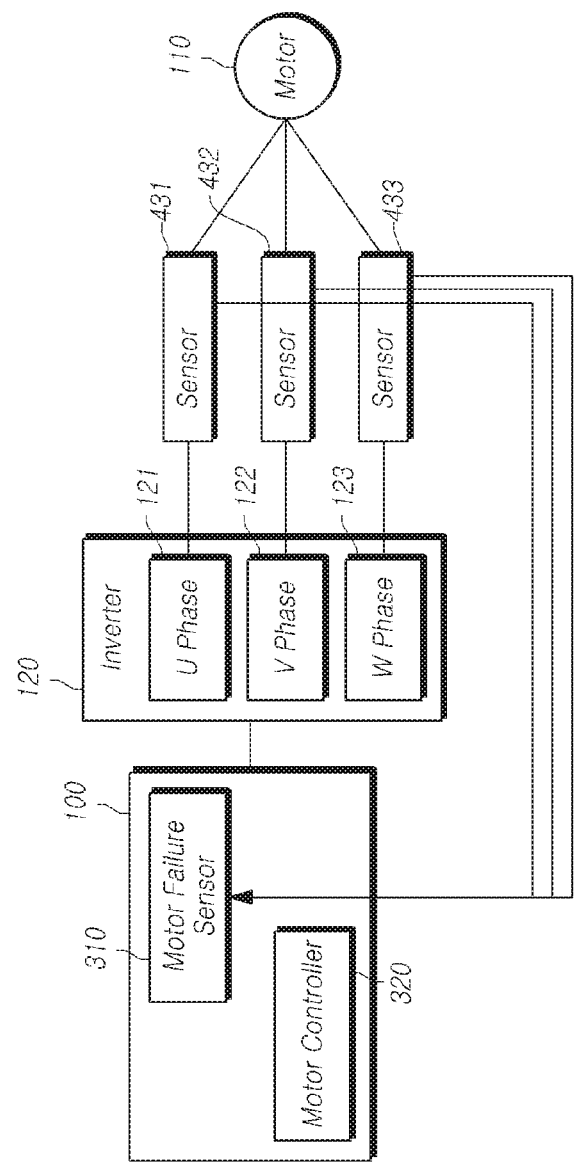
FIG. 4 is a diagram for explaining an operation in which a motor failure sensor of a vehicle motor control apparatus according to an embodiment is applicable in a vehicle.

FIG. 4 is a diagram for explaining an operation in which a motor failure sensor of a vehicle motor control apparatus according to an embodiment is applicable in a vehicle.

Referring to FIG. 4, the motor failure sensor is able to determine whether a failure has occurred in the motor based on information about a current flowing in each phase of the motor.

Specifically, FIG. 4 is a simplified view of the vehicle motor control apparatus 100, the inverter 120, and the motor 110 described above with reference to FIG. 1. As illustrated in FIG. 4, the vehicle motor control apparatus 100 may include a motor failure sensor 310 and a motor controller 320.

According to an embodiment, the motor failure sensor 310 may determine whether a failure has occurred in the motor 110 based on information about a current flowing in each phase of the motor 110 provided in the vehicle steering system. For example, the motor failure sensor 310 may detect the failure of the motor 110 based on the information of the current supplied to each phase of the motor 110. That is, the inverter 120 may supply a current to the motor 110, and in this, when the motor 110 is a three-phase motor, the inverter 120 drives the current of each of the U phase 121, the V phase 122, and the W phase 123 of the motor 110. In this case, for each phase, a sensor capable of detecting a current supplied to each phase may be included. That is, a U phase sensor 431 configured to detect a current supplied to the U phase 121, and a V phase sensor 432 configured to detect a current supplied to the V phase 122, and a W phase sensor 433 configured to detect a current supplied to the W phase 123 may be included. In this case, the current information of each phase detected from the U phase sensor 431, the V phase sensor 432, and the W phase sensor 433 may be sent to the motor failure sensor 310. That is, the motor failure sensor 310 may receive information from a separate sensor in order to determine whether the motor 110 has failed. According to an example, the U phase sensor 431, the V phase sensor 432, and the W phase sensor 433 may be current sensors or shunt sensors located inside or outside the motor 110.

The motor failure sensor 310 may determine that the failure of the motor 110 has occurred when the current information of a normal phase is not received for each phase. That is, when the currents of the three phases of the motor 110 are respectively transmitted by a set value but the current flowing into the motor 110 has a value of 0 or the current of each phase becomes the same as another phase, the disconnection or short circuit is caused inside the motor 110 so that a proper current may not flow into the motor 110. However, this is an example as to how to determine a motor failure, and the present disclosure is not limited thereto. The motor failure sensor 310 may also determine that a failure has occurred in the motor 110 when information of each phase is received as information different from a normally instructed current value.

In addition, the motor failure sensor 310 may classify and determine the failure type of the motor based on the current information. According to an example, the failure type of the motor may be classified into disconnection of at least one of respective phases of the motor, a short circuit of at least two of respective phases of the motor, or non-identification of the failure type. That is, the motor failure sensor 310 may determine which one of the three phases of the motor 110 has been disconnected, may determine which ones of the three phases of the motor 110 have been short-circuited, or may only determine whether the motor has failed but may not determine the failure type of the motor.

Specifically, the motor failure sensor 310 may determine which one of the U phase, V phase, and W phase, which are the three phases of the motor 110, has been disconnected based on the phase current information of the motor 110. That is, when the current value is detected as 0 in the sensor located on each phase, it means that no current flows into the corresponding phase. Thus, the motor failure sensor 310 may determine that the phase, of which the current value is detected as zero, has been disconnected.

In addition, the motor failure sensor 310 may determine which any two of the U phase, V phase, and W phase, which are the three phases of the motor 110, have been short-circuited based on the phase current information of the motor 110. That is, when the same current value is detected by two sensors among the sensors located on respective phases, it means that the same current flows into the corresponding two phases. Thus, the motor failure sensor 310 may determine that the two phases, from which the same current value is detected, have been short-circuited. This is because, when the two phases have been short-circuited, the potentials of the two phases become the same, and the same current flows.

Likewise, the motor failure sensor 310 may also determine whether all the three phases of the motor 110 have been short-circuited based on the phase current information of the motor 110. That is, when the same current value is detected in all the sensors located on respective phases, it means that the same current flows into each of the three phases of the motor. Thus, in this case, the motor failure sensor 310 may determine that the three phases are all short-circuited.

However, according to an example, there may be a case in which the motor failure sensor 310 is capable of determining the failure of the motor based on the phase current information of the motor 110, but is not capable of detecting the failure type of the motor. For example, when the motor current is not supplied to each phase of the motor depending on an instructed current value, it may be determined that the motor has failed, but it may be impossible to specifically detect whether the motor has been short-circuited or disconnected. As another example, when the motor current supplied to each phase of the motor abruptly fluctuates, it may be determined that the motor has failed, but it may be impossible to specifically detect whether the motor has been short-circuited or disconnected. In this case, the motor failure sensor 310 may determine that the motor has failed, and in this case, the motor failure sensor 310 may determine that the failure type of the motor has not been identified.

However, this is merely an example in which the failure type of the motor is not identified, and the case in which the failure type of the motor is not identified is not limited to the above-described example.

In addition, although not illustrated in FIG. 4, the motor failure sensor 310 according to an embodiment may include a separate sensor to determine whether the motor 110 has failed. For example, the motor failure sensor 310 may determine the position of the rotor and the rotation speed of the motor through a sensor mounted inside or outside the motor 110. As another example, the motor failure sensor 310 may receive information necessary for determining whether the motor 110 has failed through the sensor mounted inside or outside the vehicle in order to determine whether the motor 110 has failed. For example, the motor failure sensor 310 may receive steering angle information or driver's steering torque information through a steering angle sensor or a driver's steering torque sensor mounted on the vehicle. In this case, the motor failure sensor 310 may determination information to be output from the motor 110 based on the steering angle information or the driver's steering torque information, and may then determine whether the motor 110 has failed through the received actual motor information, for example, the information of the motor rotator position, the motor rotation speed, or the like.

According to this, by applying a demagnetization current for permanently demagnetizing the magnet in the motor when a failure has occurred in the motor, the driver is able to stably perform the steering even when the motor has failed. In addition, even when the failure situation of the motor is not specifically detected, it is possible to permanently demagnetize the magnet in the motor so as to enable the driver to stably perform steering by performing all the multiple methods of applying a demagnetization current, which are executable by a measure against the failure situation.

In addition, the configuration of the motor failure sensor 310 described above is an example, and the configuration in which the motor failure sensor 310 is operable in the vehicle is not limited to the above-described example. The application of the motor failure sensor 310 in an in-vehicle system may be implemented in various configurations having the functions, which are the same as those described above. In other words, the motor failure sensor 310 may operate by receiving information from the outside, and may also detect a failure by itself if it is capable of performing a function for failure detection.

Figure 5:
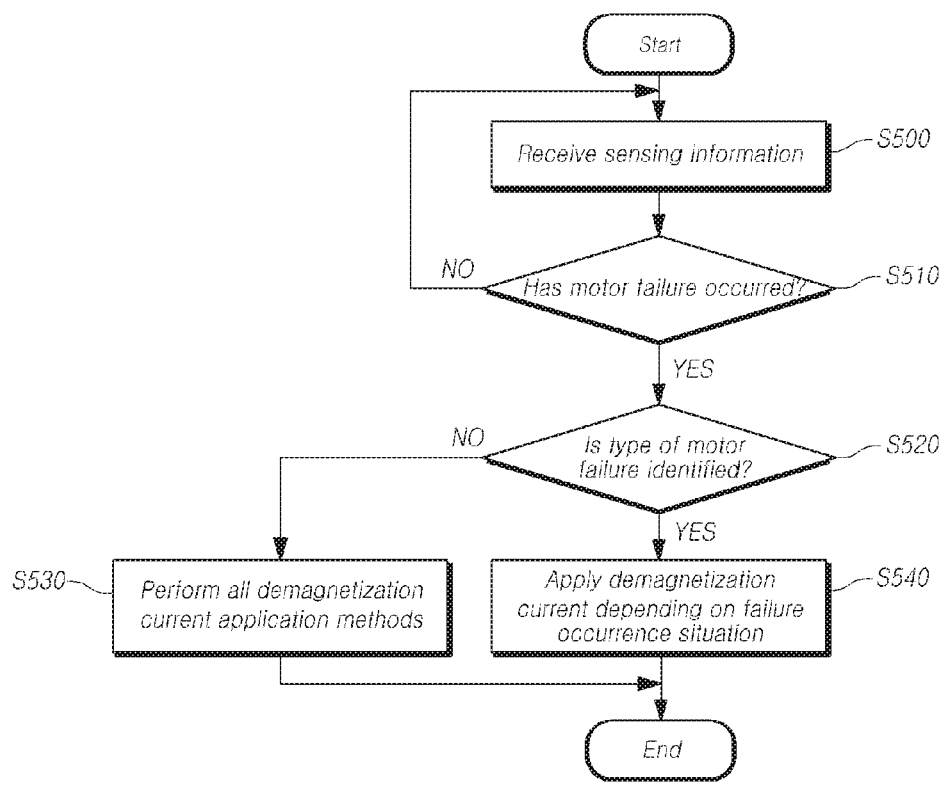
FIG. 5 is a diagram for explaining the operation of a vehicle motor control apparatus according to an embodiment.

FIG. 5 is a diagram for explaining the operation of a vehicle motor control apparatus according to an embodiment.

Referring to FIG. 5, in the case in which a failure has occurred in the motor, the vehicle motor control apparatus may operate differently depending on the failure occurrence phase and whether each phase has been short-circuited or disconnected.

Specifically, as described above, the motor failure sensor 310 of the vehicle motor control apparatus 100 according to an embodiment may receive sensing information for detecting a motor failure (S500). That is, the motor failure sensor 310 according to an embodiment may receive the information about a current flowing into each phase of the motor.

In addition, the motor failure sensor 310 may determine whether a failure has occurred in the motor through the current information of each phase (S510). As described above, the motor failure sensor 310 according to an exemplary embodiment may determine whether a failure has occurred in the motor based on the information about a current flowing into each phase of the motor. When it is determined in step S510 that a failure has not occurred in the motor (S510, NO), the motor failure sensor 310 may receive information again and may continue to detect whether the motor has failed.

However, when it is determined in step S510 that a failure has occurred in the motor (step S510, YES), the motor failure sensor 310 may identify the failure type of the motor (step S520). The motor failure sensor 310 may detect whether the motor has been short-circuited or disconnected based on information about a current flowing into each phase of the motor. Therefore, when the failure type is identified in step S520 (step S520, YES), the motor controller 320 may apply a demagnetization current depending on the failure occurrence situation (step S540). In this case, the operation of the motor controller 320 in the failure occurrence situation will be described in more detail below with reference to FIG. 6.

According to an example, the demagnetization current applied by the motor controller 320 may be a current for permanently demagnetizing the magnet in the motor. A motor used in an electric power steering system may be implemented as, for example, a three-phase BLAC motor. In this case, a magnet is essentially included in the motor. In this case, magnets used in motors may have different grades depending on the utilization and design requirements of the motors. In this case, the magnitude characteristics of currents that are capable of demagnetizing the magnets of the motors may vary depending on the types of the magnets. Accordingly, the demagnetization current applied by the motor controller 320 to permanently demagnetize a magnet in the motor may have a predetermined value depending on a motor characteristic. Alternatively, the demagnetization current applied by the motor controller 320 to permanently demagnetize a magnet in the motor may have a value preset by the user depending on the motor characteristic. However, this is an example of setting the demagnetization current to perform the function of permanently demagnetizing the magnet in the motor so as not to generate the braking torque, and the method of setting the demagnetization current is not limited thereto. According to another example, the demagnetization current may be determined from a sensor in the motor in order to perform the function described above, or may be preset in other ways, and may be implemented in a variety of similar ways.

Figure 7:
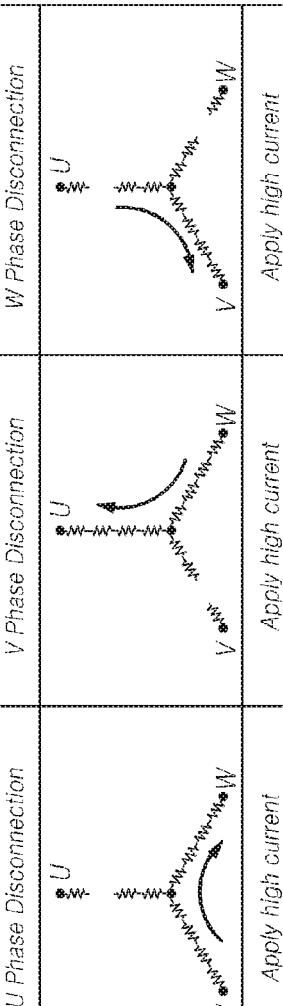
FIG. 7 is a diagram for explaining exemplary operations of a motor controller when any one phase of a motor according to an embodiment has been disconnected.
Figure 8:
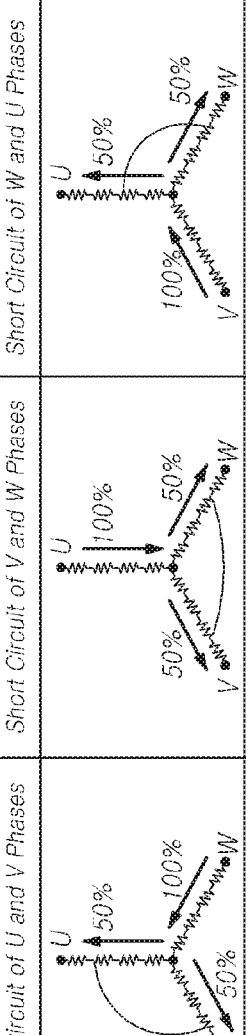
FIG. 8 is a diagram for explaining exemplary operations of a motor controller when any two phases of a motor according to an embodiment have been short-circuited.

When it is determined in step S520 that the failure type of the motor has not been identified (S520, NO), the motor controller 320 may perform all the methods for applying the magnetization current (S530). That is, even when the failure situation of the motor is not specifically detected, the motor controller 320 may permanently demagnetizing the magnet in the motor by performing all the multiple methods of applying a demagnetization current, which are capable of being performed as a measure of coping with the failure situation. For example, the motor controller 320 may perform all the methods of applying a demagnetization current, which are capable of being performed when the two phases of the motor have been short-circuited, and the methods of applying a magnetization current, which are capable of being performed when any one phase of the motor has been disconnected. For example, in the case in which the occurrence of a failure is detected but the failure type is not identified since it is impossible to detect the phase in which the failure has occurred and to determine whether each phase has been short-circuited or disconnected, the motor controller 320 may sequentially execute the methods of applying a demagnetization current. For example, the motor controller 320 may apply a demagnetization current from the V phase to the W phase, may apply a demagnetization current from the W phase to the U phase, may apply a demagnization current from the U phase to the V phase, may apply a demagnetization current from the W phase to the U and V phases, may apply a demagnetization from the U phase to the V and W phases, and may apply a demagnetization from the V phase to the U and W phases. That is, if the failure type of the motor is not identified in step S520 (S520, NO), the motor controller 320 may perform all the methods of applying a demagnetization current, which are illustrated in FIGS. 7 and 8 described below.

This is for permanently demagnetizing the magnet in the motor by performing all the methods of applying a demagnetization current when a specific motor failure situation is not detected since the number of the cases in which winding in the motor has been short-circuited or disconnected is limited. However, the order of the methods of applying a demagnetization current by the motor controller 320 described above is an example, and may be differently set. For example, the order of the methods of applying a demagnetization current may be set in advance, or may be differently set depending on the user.

Through this, the vehicle motor control apparatus 100 is capable of preventing or minimizing the generation of a braking torque that may be generated in a motor when the motor has failed, thereby enabling the driver to perform a stable steering operation.

Figure 6:
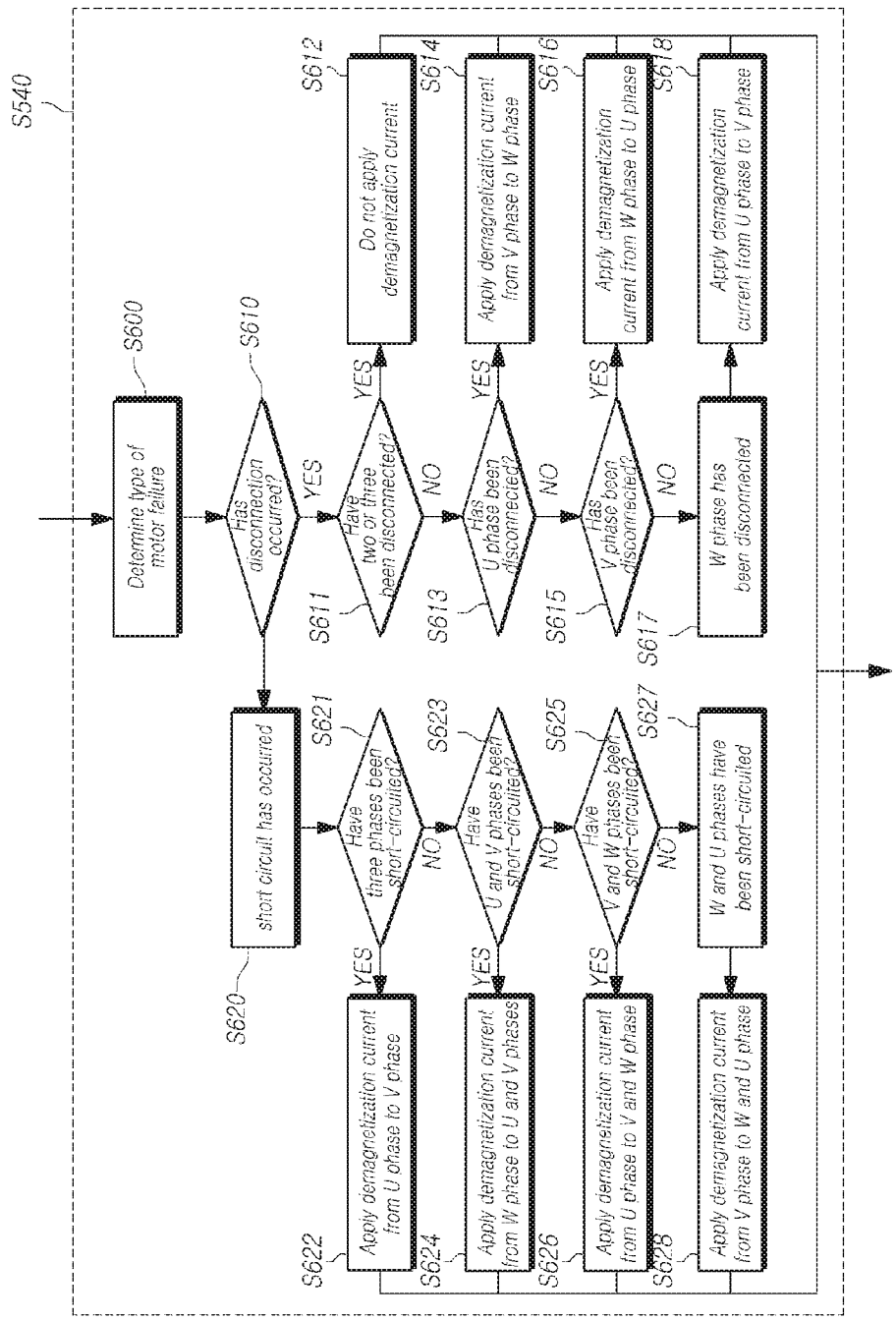
FIG. 6 is a view for explaining a process of determining the operation of a motor controller when the type of a failure of a motor according to an embodiment is confirmed.

FIG. 6 is a view for explaining a process of determining the operation of a motor controller when the type of a failure of a motor according to an embodiment is confirmed.

Referring to FIG. 6, when the specific failure type of the motor is identified, the motor controller 320 according to an embodiment may perform an operation corresponding to each situation depending on the failure occurrence situation.

Specifically, the motor controller 320 may identify the failure type of the motor (S600). That is, since this is the case in which it is possible to detect the failure type of the motor, the motor controller 320 may determine the phase in which the failure has occurred and may determine whether each phase has been short-circuited or disconnected.

Thereafter, the motor controller 320 may identify whether a winding in the motor has been disconnected (S610). In this case, when the winding in the motor has been disconnected, there may be a case in which only one phase has not been disconnected. Accordingly, when the internal winding of the motor has been disconnected (S610, YES), the motor controller 320 may identify whether two phases or three phases of the three-phase motor are disconnected (S611). That is, since the conductors of the three phases of the three-phase motor meet at the neutral point, when two phases or three phases of the three-phase motor are disconnected, the magnet may not be permanently demagnetized even if the motor controller 320 applies a high current sufficient for permanent demagnetization of the magnet. Accordingly, when two phases or three phases of the three-phase motor are disconnected (step S611, YES), the motor controller 320 may not apply the demagnetization current to the motor (S612).

However, when two phases or three phases have not been disconnected (step S611, NO), the motor controller 320 may determine that any one phase of the motor has been disconnected. Accordingly, the motor controller 320 may identify whether the U phase has been disconnected (S613).

When the U phase has been disconnected (step S613, YES), the motor controller 320 may apply a current such that a demagnetization current flows in the V phase and the W phase. At this time, the motor controller 320 may apply the demagnetization current from the V phase to the W phase for effective permanent magnetization (S614). In this case, however, it is sufficient if the motor controller 320 applies the current such that the demagnetization current flows in the V phase and the W phase. That is, in step S614, the method of applying the demagnetization current from the V phase to the W phase is an example of a demagnetization current application method. When the U phase has been disconnected, the motor controller 320 may apply the demagnetization current from the W phase to the V phase. In this case, there is no difference in the effect of permanently demagnetizing the magnet in the motor. In contrast, when the U phase has not been disconnected (S613, NO), the motor controller 320 may identify whether the V phase has been disconnected (S615).

When the V phase has been disconnected (step S615, YES), the motor controller 320 may apply a current such that the demagnetization current flows in the W phase and the U phase. At this time, the motor controller 320 may apply the demagnetization current from the W phase to the U phase for effective permanent magnetization (S616). In this case, however, it is sufficient if the motor controller 320 applies the current such that the demagnetization current flows in the W phase and the U phase. That is, in step S616, the method of applying the demagnetization current from the W phase to the U phase is an example of a demagnetization current application method. When the V phase has been disconnected, the motor controller 320 may apply the demagnetization current from the U phase to the W phase. In this case, there is no difference in the effect of permanently demagnetizing the magnet in the motor.

In contrast, when the V phase has not been disconnected (S615, NO), the motor controller 320 may determine that the W phase has been disconnected (S617). In this case, the motor controller 320 may apply a current such that the demagnetization current flows in the U phase and the V phase. At this time, the motor controller 320 may apply the demagnetization current from the U phase to the V phase for effective permanent magnetization (S618). In this case, however, it is sufficient if the motor controller 320 applies the current such that the demagnetization current flows in the U phase and the V phase. That is, in step S618, the method of applying the demagnetization current from the U phase to the V phase is an example of a demagnetization current application method. When the W phase has been disconnected, the motor controller 320 may apply the demagnetization current from the V phase to the U phase. In this case, there is no difference in the effect of permanently demagnetizing the magnet in the motor.

Specific exemplary operations of the motor controller 320 when any one of the phases of the motor has been disconnected in the above case are illustrated in FIG. 7. Hereinafter, the exemplary operations of the motor controller 320 will be described with reference to FIG. 7.

FIG. 7 is a diagram for explaining exemplary operations of a motor controller when any one phase of a motor according to an embodiment has been disconnected.

Referring to FIG. 7, when one or more phases of the motor are disconnected, the motor controller 320 may determine a method of applying a current such that the demagnetization current flows in the remaining phase, which has not been disconnected.

Specifically, for example, when the U phase has been disconnected, the motor controller 320 may apply a current such that the demagnetization current flows in the V phase and the W phase. In this case, no current flows in the U phase, and even if the magnet in the motor is permanently demagnetized due to the demagnetization current flowing in the V phase and W phase and thus the current supplied to the motor is interrupted, the braking torque may not be generated or minimized. That is, as illustrated in FIG. 7, the motor controller 320 may apply the demagnetization current from the V phase to the W phase. Specifically, as an example in the drawing, when the U phase has been disconnected, it is sufficient if the motor controller 320 applies a current such that the demagnetization current flows in the V phase and the W phase. That is, the motor controller 320 may apply the demagnetization current from the W phase to the V phase.

Likewise, when the V phase has been disconnected, the motor controller 320 may apply a current such that the demagnetization current flows in the U phase and the W phase. In this case, no current flows in the V phase and, even if the magnet in the motor is permanently demagnetized due to the demagnetization current flowing in the U phase and W phase and thus the current supplied to the motor is interrupted, the braking torque may not be generated or minimized. That is, as illustrated in FIG. 7, the motor controller 320 may apply the demagnetization current from the W phase to the U phase. Specifically, as an example in the drawing, when the V phase has been disconnected, it is sufficient if the motor controller 320 applies a current such that the demagnetization current flows in the W phase and the U phase. That is, the motor controller 320 may apply the demagnetization current from the U phase to the W phase.

Likewise, when the W phase has been disconnected, the motor controller 320 may apply a current such that the demagnetization current flows in the U phase and the V phase. In this case, no current flows in the W phase and, even if the magnet in the motor is permanently demagnetized due to the demagnetization current flowing in the U phase and V phase and thus the current supplied to the motor is interrupted, the braking torque may not be generated or minimized. That is, as illustrated in FIG. 7, the motor controller 320 may apply the demagnetization current from the U phase to the V phase. However, as an example in the drawing, when the W phase has been disconnected, it is sufficient if the motor controller 320 applies a current such that the demagnetization current flows in the U phase and the V phase. That is, the motor controller 320 may apply the demagnetization current from the V phase to the U phase.

Up to now, exemplary specific operations of the motor controller 320 in the disconnection situation of the winding in the motor have been described with reference to FIG. 7. Hereinafter, the operation determination process of the motor controller 320 in the short-circuited situation of the winding in the motor will be described with reference to FIG. 6.

Referring to FIG. 6, it is possible to confirm the operation decision process of the motor controller 320 when a short circuit has occurred in the winding in the motor.

Specifically, after identifying the motor failure situation (S600), in step S610, the motor controller 320 may identify whether a winding in the motor has been disconnected. In this process, in step S610, when it is identified that the V phase has not been disconnected (S610, NO), the motor controller 320 may determine that a short circuit has occurred (S620). In this case, since all the three phases may be short-circuited, the motor controller 320 may identify whether all the three phases of the three-phase motor have been short-circuited (S621).

When all the three phases have been short-circuited (S621, YES), since the short-circuited phases have the same potential and the same current flows therein, there is not a substantial difference even if the demagnetization current is applied to any phase. However, for efficient permanent demagnetization of the magnet in the motor, the motor controller 320 may set in advance the direction in which the demagnetization current is to be applied when the three phases are short-circuited. In this case, the direction of the demagnetization current for permanently demagnetizing the magnet when the three phases have been short-circuited may be the direction in which the demagnetization current flows from the U phase to the V phase (S622). However, this is an example in which the demagnetization current is applied when the three phases have been short-circuited, and the present disclosure is not limited thereto.

In contrast, when all the three phases have not been short-circuited (S621, NO), the motor controller 320 may determine that any two phases have been short-circuited. Accordingly, the motor controller 320 may identify whether the U phase and the V phase have been short-circuited (S623).

When the U phase and the V phase have been short-circuited (step S623, YES), the motor controller 320 may apply a current such that the demagnetization current flows in the W phase and in the U phase and the V phase. At this time, the motor controller 320 may apply the demagnetization current from the W phase to the U phase and the V phase for effective permanent magnetization (S624). In this case, however, it is sufficient if the motor controller 320 applies the current such that the demagnetization current flows in the W phase and in the U and the V phases. That is, in step S624, the method of applying the demagnetization current from the W phase to the U and V phases is an embodiment of a demagnetization current application method. When the U and V phases are disconnected, the motor controller 320 may apply the demagnetization current from the U and V phases to the W phase. In this case, there is no difference in the effect of permanently demagnetizing the magnet in the motor. In contrast, when the U phase and the V phase have not been short-circuited (S623, NO), the motor controller 320 may identify whether the V phase and the W phase have been short-circuited (S625).

When the V phase and the W phase have been short-circuited (step S625, YES), the motor controller 320 may apply a current such that the demagnetization current flows in the U phase and in the V and W phases. At this time, the motor controller 320 may apply the demagnetization current from the U phase to the V and W phases for effective permanent magnetization (S626). In this case, however, it is sufficient if the motor controller 320 applies the current such that the demagnetization current flows in the U phase and in the V and W phases. That is, in step S626, the method of applying the demagnetization current from the U phase to the V and W phases is an example of a demagnetization current application method. When the V phase and the W phase are disconnected, the motor controller 320 may apply the demagnetization current from the V phase and the W phase to the U phase. In this case, there is no difference in the effect of permanently demagnetizing the magnet in the motor.

In contrast, when the V phase and the W phase have not been short-circuited (S625, NO), the motor controller 320 may determine that the W phase and the U phase have been short-circuited (S627). In this case, the motor controller 320 may apply a current such that the demagnetization current flows in the V phase and in the W and U phases. At this time, the motor controller 320 may apply the demagnetization current from the V phase to the W and U phases for effective permanent magnetization (S628). In this case, however, it is sufficient if the motor controller 320 applies the current such that the demagnetization current flows in the V phase and in the W and U phases. That is, in step S628, the method of applying the demagnetization current from the V phase to the W and U phases is an example of a demagnetization current application method. When the W phase and the U phase have been short-circuited, the motor controller 320 may apply the demagnetization current from the W and U phases to the V phase. In this case, there is no difference in the effect of permanently demagnetizing the magnet in the motor.

Specific exemplary operations of the motor controller 320 when any two phases of the motor have been short-circuited as described above are illustrated in FIG. 8. Hereinafter, the exemplary operations of the motor controller 320 will be described with reference to FIG. 8.

FIG. 8 is a diagram for explaining exemplary operations of a motor controller when any two phases of a motor according to an embodiment have been short-circuited.

Referring to FIG. 8, when any two phases of the motor have been short-circuited, the motor controller 320 may identify a method of applying a current such that the demagnetization current flows from the remaining one phase, which has not been short-circuited, to the two short-circuited phases.

Specifically, for example, when the U phase and the V phase have been short-circuited, the motor controller 320 may apply a current such that the demagnetization current flows in the W phase and in the V and U phases. In this case, since the U phase and the V phase have the same potential value, the demagnetization current applied from the W phase maybe divided into half sizes, which flow in the U phase and the V phase, respectively. In this case, a larger demagnetization current may be applied in consideration of the size of current reduced by half in order to permanently demagnetize the magnet in the motor using the current flowing in each phase. This allows the magnet in the motor to be permanently demagnetized, and thus even if the current supplied to the motor is interrupted, the braking torque may not be generated or may be minimized. That is, as illustrated in FIG. 8, the motor controller 320 may apply the demagnetization current from the W phase to the U and V phases. However, this is an example, and when the U phase and the V phase have been short-circuited, it is sufficient if the motor controller 320 applies a current such that the demagnetization current flows in the W phase and in the U and V phases. That is, the motor controller 320 according to an example, may apply the demagnetization current from the U and V phases to the W phase.

Likewise, when the V phase and the W phase have been short-circuited, the motor controller 320 may apply a current such that the demagnetization current flows between the U phase and the V and W phases. In this case, since the V phase and the W phase have the same potential value, the demagnetization current applied from the U phase maybe divided into half sizes, which flow in the V phase and the W phase, respectively. In this case, a larger demagnetization current may be applied in consideration of the size of current reduced by half in order to permanently demagnetize the magnet in the motor using the current flowing in each phase. This allows the magnet in the motor to be permanently demagnetized, and thus even if the current supplied to the motor is interrupted, the braking torque may not be generated or may be minimized. That is, as illustrated in FIG. 8, the motor controller 320 may apply the demagnetization current from the U phase to the V and W phases. However, as an example in the drawing, when the V phase and the W phase have been short-circuited, it is sufficient if the motor controller 320 applies a current such that the demagnetization current flows in the U phase and in the V and W phases. That is, the motor controller 320 may apply the demagnetization current from the V and W phases to the U phase.

In this case, when the W phase and the U phase have been short-circuited, the motor controller 320 may apply a current such that the demagnetization current flows between the V phase and the W and U phases. In this case, since the W phase and the U phase have the same potential value, the demagnetization current applied from the V phase may be divided into half sizes, which flow in the W phase and the U phase, respectively. In this case, a larger demagnetization current may be applied in consideration of the size of current reduced by half in order to permanently demagnetize the magnet in the motor using the current flowing in each phase. This allows the magnet in the motor to be permanently demagnetized, and thus even if the current supplied to the motor is interrupted, the braking torque may not be generated or may be minimized. That is, as illustrated in FIG. 8, the motor controller 320 may apply the demagnetization current from the V phase to the W and U phases. However, as an example in the drawing, when the W phase and the U phase have been short-circuited, it is sufficient if the motor controller 320 applies a current such that the demagnetization current flows in the V phase and in the W and U phases. That is, the motor controller 320 may apply the demagnetization current from the W and U phases to the V phase.

Accordingly, when it is possible to specifically detect the failure situation in the motor, the motor controller 320 may apply the demagnetization current to a winding in the motor in the short-circuit or disconnection situation of each phase so as to prevent or minimize the generation of the braking torque of the motor.

As described above with reference to FIGS. 3 to 8, according to embodiments disclosed herein, when a failure has occurred in the motor provided in the vehicle steering system, a demagnetization current for permanently demagnetizing the magnet in the motor is applied so as to enable the driver to perform stable steering.

Hereinafter, a vehicle motor control method capable of performing all the above-described embodiments will be described with reference to the accompanying drawings.

Figure 9:
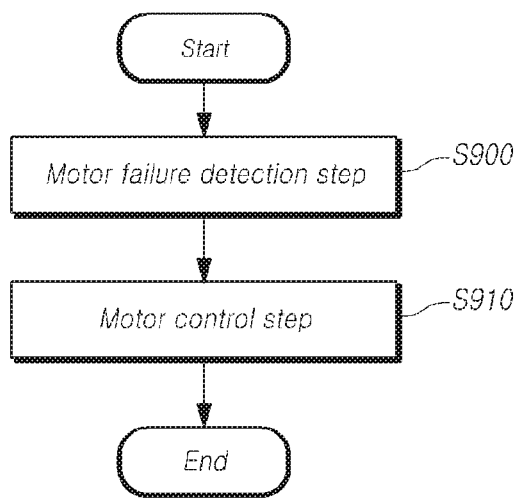
FIG. 9 is a diagram for explaining the operations of a vehicle motor control method according to an embodiment.

FIG. 9 is a diagram for explaining the operations of a vehicle motor control method according to an embodiment.

A vehicle motor control method according to an embodiment may include a motor failure detection step of determining whether a failure has occurred in a motor based on information of a current flowing in each phase of the motor provided in a vehicle steering system, and a motor control step of applying a demagnetization current to the motor for permanently demagnetizing the magnet in the motor when the failure has occurred in the motor.

In the motor failure detection step, it may be determined whether a failure has occurred in the motor based on information about a current flowing in each phase of the motor provided in the vehicle steering system (S900). For example, in the motor failure detection step, the failure of the motor may be detected based on information of the current supplied to each phase of the motor. To this end, the motor failure detection step, information may be received from a separate sensor in order to determine whether the motor has failed. For example, in the motor failure detection step, information about a current supplied to each phase of the motor via a current sensor or a shunt sensor located inside or outside the motor may be received. In this case, in the motor failure detection step, it may be determined that a failure has occurred in the motor when current information in a normal case is not received for each phase.

In addition, in the motor failure detection step, the failure type of the motor may be classified and determined based on the current information, and the failure type of the motor may be classified into disconnection of at least one of respective phases of the motor, a short circuit of at least two of respective phases of the motor, or non-identification of the failure type. In other words, in the motor failure detection step, it may be determined which phase has been disconnected among three phases in the motor or which phases have been short-circuited among the three phases of the motor, or the failure type of the motor may not be determined. For example, in the motor failure detection step, it may be identified which one of the U phase, V phase, and W phase, which are the three phases of the motor, has been disconnected based on the phase current information of the motor. In addition, in the motor failure detection step, it may be determined which two of the U phase, V phase, and W phase, which are the three phases of the motor, have been short-circuited based on the phase current information of the motor. In this case, it is possible to determine whether all the three phases of the motor have been short-circuited based on the phase current information of the motor. In addition, in the motor failure detection step, there may be a case in which it is possible to determine whether the motor has failed based on the current information of each phase, but it is impossible to identify the phase in which a failure has occurred and to determine whether each phase has been short-circuited or disconnected. In this case, the motor failure sensor may determine whether the motor has failed, but may be determined that the failure type of the corresponding motor is not identified.

Meanwhile, when a failure has occurred in the motor, in the motor control step, a demagnetization current may be applied to the motor for permanently demagnetizing the magnet in the motor (S910). That is, when a motor failure is detected in the motor failure detection step, in the motor control step, a demagnetization current for permanently demagnetizing the motor magnet may be applied in order to prevent or minimize the occurrence of the braking torque of the motor, rather than simply interrupting the current supplied to the motor. At this time, the demagnetization current for permanent demagnetization of the motor magnet may be preset based on a motor-inherent characteristic. That is, since the magnitude of a high current sufficient for the permanent magnetization of the magnet in the motor is determined depending on the characteristic of the motor magnet, the demagnetization current supplied in the motor control step may be a preset current value or may be a value set by the user.

When any one phase of the motor has been disconnected, in the motor control step, a current may be applied such that a demagnetization current flows in the remaining phases, which have not been disconnected. That is, since no current flows in the disconnected phase when any one phase in the motor has been disconnected, it is possible to permanently demagnetize the magnet in the motor by causing a demagnetization current to flow in the remaining phases. Through this, in the vehicle motor control method, it is possible to prevent a braking torque from being generated in the motor due to the residual current or magnetic component, or to minimize the generation of the braking torque.

In this case, in the motor control step, when the motor has been disconnected in the U phase, the demagnetization current may be applied from the V phase to the W phase, when the motor has been disconnected in the V phase, the demagnetization current may be applied from the W phase to the U phase, and when the motor has been disconnected in the W phase, in the motor control step, the demagnetization current may be applied from the U phase to the V phase. That is, since the respective phases of a three-phase motor are a U phase, a V phase, and a W phase, in the motor control step, the direction in which the demagnetization current is to flow when any one phase is disconnected may be set in advance as a measure of coping with three types of disconnection for efficient permanent demagnetization.

Meanwhile, when any two phases of the motor have been short-circuited, in the motor control step, a current may be applied such that the demagnetization current flows from the remaining non-short-circuited phase to the two short-circuited phases. That is, when the two phases in the motor have been short-circuited, the short-circuited phases become equal in potential and the same current flows therein. Thus, it is possible to permanently demagnetize the magnet in the motor by causing the demagnetization current to flow from the non-short-circuited phase to the short-circuited phases. Through this, in the vehicle motor control method, it is possible to prevent a braking torque from being generated in the motor due to the residual current or magnetic component, or to minimize the generation of the braking torque.

In this case, in the motor control step, when the U phase and V phase of the motor have been short-circuited, the demagnetization current may be applied from the W phase to the U and V phases, when the V phase and W phase of the motor have been short-circuited, the demagnetization current may be applied from the U phase to the V and W phases, and when the W phase and U phase of the motor have been short-circuited, the demagnetization current may be applied from the V phase to the U and V phases. That is, since the respective phases of the motor are a U phase, a V phase, and a W phase, in the motor control step, the direction in which the demagnetization current is to flow when any one phase is disconnected may be set in advance as a measure of coping with three cases in which any two phases are short-circuited for efficient permanent demagnetization.

In addition, when the three phases of the motor have been short-circuited, in the motor control step, a current may be supplied such that the demagnetization current flows from the U phase to the V phase. That is, when the three phases of the motor have been short-circuited, since the short-circuited phases have the same potential and the same current flows therein, it is possible to permanently demagnetize the magnet in the motor even when the demagnetization current is applied to any phase. However, in the motor control step, the direction in which the demagnetization current is to flow when the three phases have been short-circuited may be set in advance for efficient permanent demagnetization of the magnet in the motor. In this case, the direction of the efficient demagnetization current for permanently demagnetizing the magnet when the three phases have been short-circuited may be the direction in which the demagnetization current flows from the U phase to the V phase.

Meanwhile, when the type of a failure in the motor is not identified, in the motor control step all multiple methods of applying a current may be performed such that the demagnetization current flows from each phase of the motor to the other two phases or multiple methods of applying a current such that the demagnetization current flows to two of respective phases of the motor. That is, there may be a case in which it is determined that a motor failure has occurred in the motor failure detection step but it is impossible to specifically determine which phase has failed or a case it is impossible to determine whether each phase has been short-circuited or disconnected. In this case, in the motor control step, it is required to prevent or minimize the generation of the braking torque of the motor based on the determination of occurrence of the motor failure. Therefore, in the motor control step, it is required to apply the demagnetization current for the permanent demagnetization of the magnet in the motor even when it is impossible to detect a phase in which a failure has occurred in the motor or to determine whether each phase has been short-circuited or disconnected. In this case, in the motor control step, all executable methods of applying a demagnetization current in all the cases in which any one phase has been disconnected or any two phases have been short-circuited may be performed. At this time, the demagnetization current application methods to be performed may be in the motor control step may be arbitrarily performed rather than being performed in a specific order. Alternatively, the order of the demagnetization current application methods to be performed in the motor control step may be set in advance. Through this, in the vehicle motor control method, it is possible to prevent a braking torque from being generated in the motor due to the residual current or magnetic component, or to minimize the generation of the braking torque.

In addition, in the motor control step, the current supplied to the motor may be interrupted after applying the demagnetization current. That is, when the demagnetization current has been applied in the motor control step, the permanent magnet has been permanently demagnetized in the motor. Thus, the corresponding motor no longer functions as a motor. Accordingly, in the motor control step, the current supplied to the motor after permanently demagnetizing the motor magnet may be interrupted in order to prevent unnecessary current application and to ensure stable running of the vehicle. Through this, in the motor control step, it is possible to perform efficient control of the vehicle.

The motor failure detection step and the motor control step of the vehicle motor control method described above may be implemented using one or more microprocessors operated by a set program for the purpose described above, and the set program may include a series of instructions for implementing respective configurations included in the vehicle motor control apparatus according to an embodiment of the technical idea of the present disclosure described above.

The terms "system", "processor", "controller", "component", "module", "interface", "model", "unit" may refer to the computer-related hardware, a combination of hardware and software, software, or software in execution. For example, the above-described components may be, but are not limited to, a process driven by a processor, a processor, a controller, a control processor, an entity, an execution thread, a program and/or a computer. For example, a controller or an application running on a processor and a controller or processor may both be components. One or more components may reside within a process and/or thread of execution and the components may reside in one system or be distributed to more than one system.

The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure. In addition, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A vehicle motor control apparatus comprising:
   a motor failure sensor configured to determine whether a failure has occurred in a motor provided in a vehicle steering system based on information about a current flowing in each phase of the motor; and
   a motor controller configured to apply a demagnetization current to the motor for permanently demagnetizing the magnet in the motor when the failure has occurred in the motor.

2. The vehicle motor control apparatus of claim 1, wherein the motor failure sensor is configured to:
   determine a failure type of the motor based on the information about the current, and
   wherein the failure type of the motor is classified into disconnection of at least one of respective phases of the motor, a short circuit of at least two of respective phases of the motor, or non-identification of the failure type.

3. The vehicle motor control apparatus of claim 1, wherein the motor controller is configured to:
   apply, when any one phase of the motor has been disconnected, a current such that a demagnetization current flows in remaining phases, which have not been disconnected.

4. The vehicle motor control apparatus of claim 3, wherein the motor controller is configured to:
   apply, when the motor has been disconnected in a U phase, the demagnetization current from a V phase to a W phase; apply, when the motor has been disconnected in the V phase, the demagnetization current from the W phase to the U phase; and
   apply, when the motor has been disconnected in the W phase, the demagnetization current from the U phase to the V phase.

5. The vehicle motor control apparatus of claim 1, wherein the motor controller is configured to:
   apply, when any two phases of the motor have been short-circuited, a current such that the demagnetization current flows from a remaining non-short-circuited phase to the two short-circuited phases.

6. The vehicle motor control apparatus of claim 5, wherein the motor controller is configured to:
   apply, when a U phase and a V phase of the motor have been short-circuited, the demagnetization current from a W phase to the U and V phases;
   apply, when the V phase and the W phase of the motor have been short-circuited, apply the demagnetization current from the U phase to the V and W phases; and
   apply, when the W phase and the U phase of the motor have been short-circuited, the demagnetization current from the V phase to the U and W phases.

7. The vehicle motor control apparatus of claim 1, wherein the motor controller is configured to:
   sequentially apply, when the failure type of the motor is not identified, a current to respective phases such that the demagnetization current flows from each phase of the motor to other two phases; and
   sequentially apply a current to respective two phases such that the demagnetization current flows in the two phases among the respective phases of the motor.

8. A vehicle motor control method comprising:
   a motor failure detection step of determining whether a failure has occurred in a motor provided in a vehicle steering system based on information about a current flowing in each phase of the motor; and
   a motor control step of applying a demagnetization current to the motor for permanently demagnetizing the magnet in the motor when the failure has occurred in the motor.

9. The vehicle motor control method of claim 8, wherein, in the motor failure detection step,
   a failure type of the motor is determined based on the information about the current, and
   the failure type of the motor is classified into disconnection of at least one of respective phases of the motor, a short circuit of at least two of respective phases of the motor, or non-identification of the failure type.

10. The vehicle motor control method of claim 8, wherein, in the motor control step,
    when any one phase of the motor has been disconnected, a current is applied such that a demagnetization current flows in remaining phases, which have not been disconnected.

11. The vehicle motor control method of claim 10, wherein, in the motor control step,
    when the motor has been disconnected in a U phase, the demagnetization current is applied from a V phase to a W phase, when the motor has been disconnected in the V phase, the demagnetization current is applied from the W phase to the U phase; and when the motor has been disconnected in the W phase, the demagnetization current is applied from the U phase to the V phase.

12. The vehicle motor control method of claim 8, wherein, in the motor control step,
    when any two phases of the motor have been short-circuited, a current is applied such that the demagnetization current flows from a remaining non-short-circuited phase to the two short-circuited phases.

13. The vehicle motor control method of claim 12, wherein, in the motor control step,
    when a U phase and a V phase of the motor have been short-circuited, the demagnetization current is applied from a W phase of the motor to U and V phases, when the V phase and the W phase of the motor have been short-circuited, the demagnetization current is applied from the U phase to the V and W phases, and when the W phase and the U phase of the motor have been short-circuited, the demagnetization current is applied from the V phase to the U and W phases.

14. The vehicle motor control method of claim 8, wherein, in the motor control step, when the failure type of the motor is not identified, a current is sequentially applied to respective phases such that the demagnetization current flows from each phase to other two phases, and a current is sequentially applied to respective two phases such that the demagnetization current flows in the two phases among the respective phases of the motor.

* * * * *